(12) United States Patent
Hanatani et al.

(10) Patent No.: US 10,715,345 B2
(45) Date of Patent: Jul. 14, 2020

(54) COMMUNICATION CONTROL DEVICE, COMMUNICATION DEVICE, COMPUTER PROGRAM PRODUCT, INFORMATION PROCESSING APPARATUS, AND TRANSMITTING METHOD FOR MANAGING DEVICES IN A GROUP

(71) Applicant: Kabushiki Kaisha Toshiba, Minato-ku (JP)

(72) Inventors: Yoshikazu Hanatani, Kawasaki (JP); Toru Kambayashi, Chigasaki (JP); Yoshihiro Oba, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/589,462

(22) Filed: Jan. 5, 2015

(65) Prior Publication Data

US 2015/0117298 A1    Apr. 30, 2015

Related U.S. Application Data

(63) Continuation of application No. PCT/JP2012/068012, filed on Jul. 13, 2012.

(51) Int. Cl.
*H04L 12/18* (2006.01)
*H04L 9/08* (2006.01)
(Continued)

(52) U.S. Cl.
CPC .......... *H04L 12/189* (2013.01); *H04L 9/0833* (2013.01); *H04L 63/065* (2013.01); *H04W 4/08* (2013.01); *H04W 8/186* (2013.01)

(58) Field of Classification Search
CPC ... H04L 12/189; H04L 9/0833; H04L 63/065; H04W 4/08; H04W 8/186
See application file for complete search history.

(56) References Cited

U.S. PATENT DOCUMENTS 8,750,511 B2   6/2014  Tanaka et al.
8,855,306 B2  10/2014  Oba et al.
(Continued)

FOREIGN PATENT DOCUMENTS

JP   2007-221621   8/2007

OTHER PUBLICATIONS

International Search Report dated Aug. 7, 2012 for PCT/JP2012/068012 filed Jul. 13, 2012 with English Translation.
(Continued)

*Primary Examiner* — Jael M Ulysse
(74) *Attorney, Agent, or Firm* — Oblon, McClelland, Maier & Neustadt, L.L.P.

(57) ABSTRACT

According to an embodiment, a communication control device is connected to communication devices and includes a storage, a generator, and an output unit. The storage is configured to store group information containing a group ID of a group and device IDs of the communication devices belonging to the group. The generator is configured to generate compressed information in which the device IDs are compressed. The output unit is configured to output, when the group information is updated, to all communication devices identified by the device IDs included in the group information after updating and to a plurality of communication devices including one or more of the communication devices identified by the device IDs not included in the group information after updating, output information containing identification information for identifying the group after updating and compressed information in which the device IDs included in the group information after updating are compressed.

8 Claims, 15 Drawing Sheets

(51) Int. Cl.
*H04L 29/06* (2006.01)
*H04W 4/08* (2009.01)
*H04W 8/18* (2009.01)

(56) References Cited

U.S. PATENT DOCUMENTS

| | | | |
|---|---|---|---|
| 2002/0152387 A1* | 10/2002 | Asano | G11B 20/00086 713/176 |
| 2003/0005293 A1* | 1/2003 | Edasawa | H04L 63/065 713/163 |
| 2003/0118018 A1* | 6/2003 | Yae | G06F 13/00 370/390 |
| 2003/0133576 A1* | 7/2003 | Grumiaux | H04L 9/0866 380/279 |
| 2004/0054891 A1* | 3/2004 | Hengeveld | H04L 9/0822 713/163 |
| 2004/0083240 A1* | 4/2004 | Sekine | G06F 17/30575 |
| 2004/0083363 A1* | 4/2004 | Hengeveld | H04L 9/0833 713/163 |
| 2004/0162870 A1* | 8/2004 | Matsuzaki | G06F 21/10 709/200 |
| 2004/0181608 A1* | 9/2004 | Cypher | G06F 15/16 709/245 |
| 2004/0253970 A1* | 12/2004 | Kunihiro | H04L 12/189 455/519 |
| 2005/0216523 A1* | 9/2005 | Sakaguchi | G06F 17/30212 |
| 2005/0238325 A1* | 10/2005 | Tanabe | G06F 21/10 386/261 |
| 2006/0168259 A1* | 7/2006 | Spilotro | H04L 63/102 709/229 |
| 2007/0021137 A1* | 1/2007 | Kokkonen | H04L 41/042 455/518 |
| 2007/0041381 A1* | 2/2007 | Wakai | H04L 41/0803 370/392 |
| 2007/0274525 A1* | 11/2007 | Takata | H04L 63/065 380/270 |
| 2007/0282881 A1* | 12/2007 | Relyea | H03M 7/30 |
| 2008/0027973 A1* | 1/2008 | Watanabe | G06F 16/71 |
| 2008/0049934 A1* | 2/2008 | Onoda | G11B 20/00086 380/201 |
| 2008/0059953 A1* | 3/2008 | Savva | G06F 9/44505 717/121 |
| 2008/0089339 A1* | 4/2008 | Tsirtsis | H04W 28/06 370/392 |
| 2008/0154957 A1* | 6/2008 | Taylor | G06F 9/4411 |
| 2008/0165958 A1* | 7/2008 | Matsushita | G06F 21/10 380/44 |
| 2009/0023435 A1* | 1/2009 | Kuivalainen | H04L 29/06 455/419 |
| 2009/0113560 A1* | 4/2009 | Kori | G06F 21/10 726/29 |
| 2009/0144406 A1* | 6/2009 | Kojo | H04L 65/1066 709/223 |
| 2010/0010986 A1* | 1/2010 | Icho | G06F 16/44 707/E17.014 |
| 2010/0074446 A1* | 3/2010 | Fuchs | H04L 9/0833 380/278 |
| 2010/0088515 A1* | 4/2010 | Nishimoto | H04N 7/1675 713/168 |
| 2010/0253971 A1* | 10/2010 | Ido | G06F 3/1203 358/1.15 |
| 2011/0141956 A1* | 6/2011 | Song | H04L 12/189 370/310 |
| 2011/0231584 A1* | 9/2011 | Ishihara | H04L 12/12 710/16 |
| 2011/0246474 A1* | 10/2011 | Abe | G06F 16/41 707/741 |
| 2011/0274155 A1* | 11/2011 | Noh | H04N 21/23439 375/240.01 |
| 2012/0149348 A1* | 6/2012 | Patel | H04L 12/1822 455/416 |
| 2012/0201376 A1 | 8/2012 | Kambayashi et al. | |
| 2012/0224519 A1* | 9/2012 | Kwon | H04B 7/0452 370/311 |
| 2012/0250867 A1 | 10/2012 | Kambayashi et al. | |
| 2013/0022196 A1 | 1/2013 | Kambayashi et al. | |
| 2014/0082365 A1* | 3/2014 | Everhart | H04L 9/0833 713/175 |

OTHER PUBLICATIONS

International Written Opinion dated Aug. 7, 2012 for PCT/JP2012/068012 filed Jul. 13, 2012.

Toru Kambayash, et al., "Requirements for New MIH Applications", 21-12-0058-01-MuGM, IEEE Mentor, May 15, 2012, slide 5.

Toru Kambayashi et al., "Security Requirements for New Use Cases", 21-12-0071-02-MuGM, IEEE Mentor, Jun. 7, 2012, slide 4.

Lily Chen, Jun. 15 Teleconference Minutes, 21-12-0077-00-MuGM, IEEE Mentor, Jun. 20, 2012, paragraph 1.4.

Ion Stoica et al., "Chord: A Scalable Peer-to-Peer Lookup Protocol for Internet Applications", Networking, IEEE/ACM Transactions on, Feb. 28, 2003, vol. 11, No. 1, pp. 17-32.

Miguel Castro et al., "Scribe: A Large-Scale and Decentralized Application-Level Multicast Infrastructure", Selected Areas in Communications, IEEE Journal on, Oct. 31, 2002, vol. 20, No. 8, pp. 1489-1499.

M. Baugher et al., "RFC 3547 The Group Domain of Interpretation", pp. 1-48, Jul. 2003, retrieved from the Internet: http://www.ietf.org/rfc/rfc3547.txt.

S. Deering, "RFC 1112 Host Extensions for IP Multicasting", pp. 1-17, Aug. 1989, retrieved from the Internet: <URL: http://www.ietf.org/rfc/rfc1112.txt.

U.S. Appl. No. 13/431,215, filed Mar. 27, 2012, 2013-0022196, Kambayashi et al.

U.S. Appl. No. 13/423,410, filed Mar. 19, 2012, 2012-0250867, Kambayashi et al.

U.S. Appl. No. 13/366,521, filed Feb. 6, 2012, 2012-0201376, Kambayashi et al.

Office Action dated Aug. 9, 2016 in Japanese Patent Application No. 2015-181306 (with English translation).

* cited by examiner

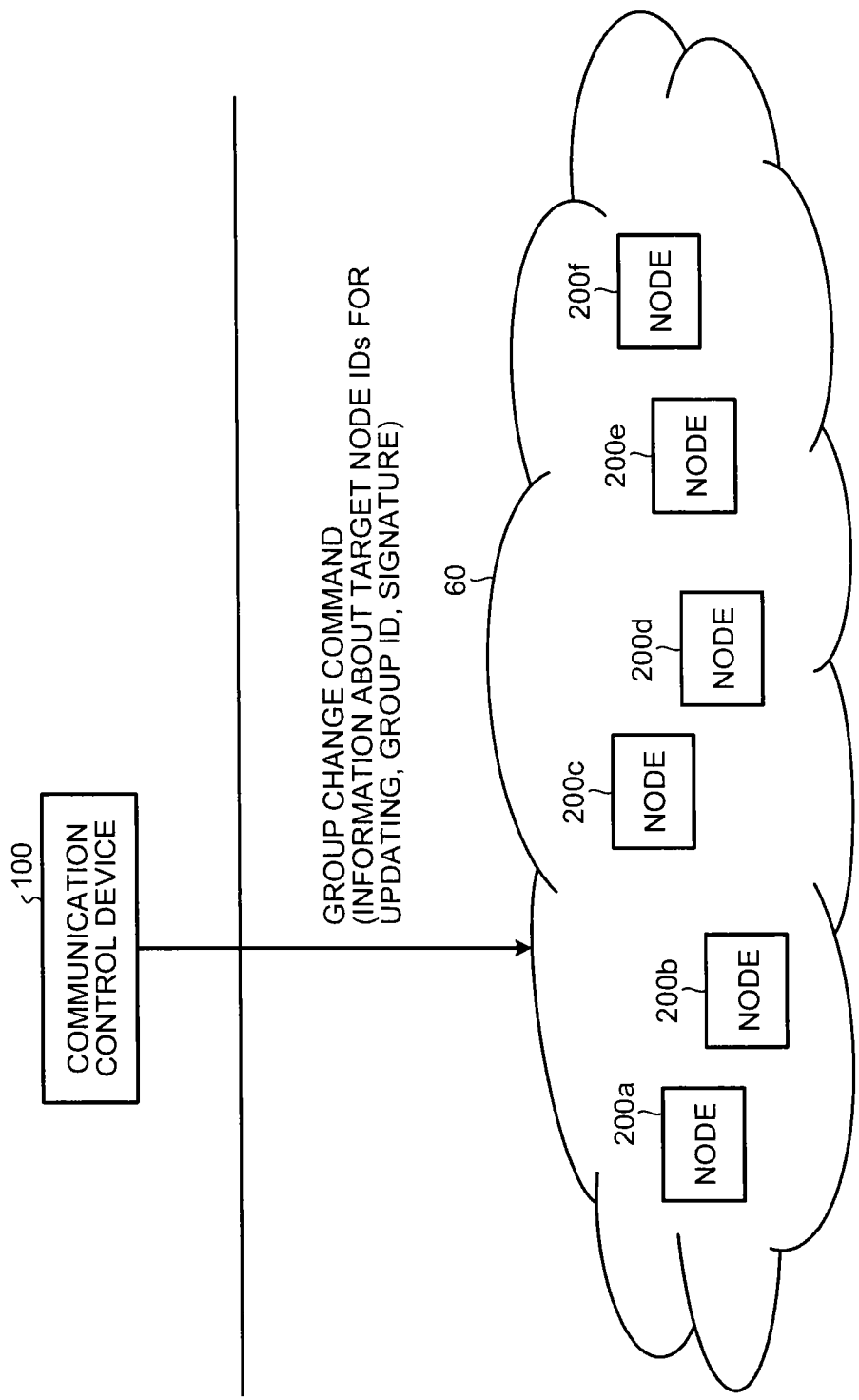

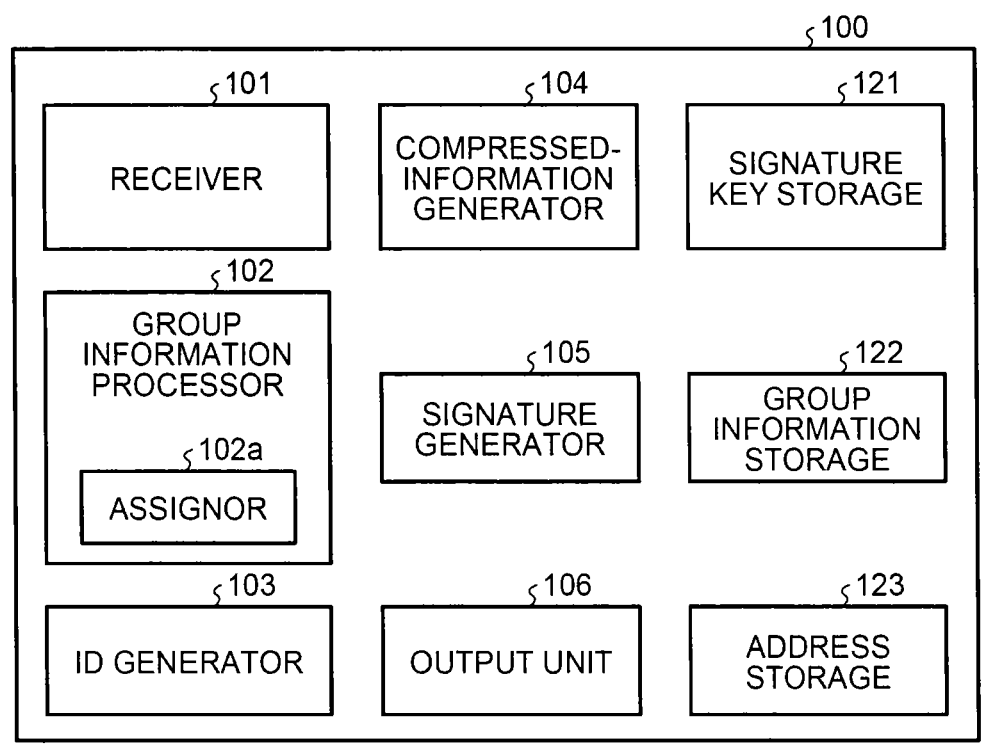

| ADDRESS | NODE ID |
|---------|---------|
| A01 | Na, Nb, Nc, Nd··· |
| A02 | Ne, Nf··· |
| ⋮ | ⋮ |

123

NODE ID LIST    WILDCARD EXPRESSION    COMPRESSED EXPRESSION 000
001         →    00*        →    *0*    →    100010
100              10*
101

00=0
11=1
10=*
01=*

12 BITS                                    6 BITS

COMMUNICATION CONTROL DEVICE, COMMUNICATION DEVICE, COMPUTER PROGRAM PRODUCT, INFORMATION PROCESSING APPARATUS, AND TRANSMITTING METHOD FOR MANAGING DEVICES IN A GROUP

CROSS-REFERENCE TO RELATED APPLICATION

This application is a continuation of International Application No. PCT/JP2012/068012, filed on Jul. 13, 2012, the entire contents of which are incorporated herein by reference.

FIELD

Embodiments of the present invention are related to a communication control device, a communication device, and a computer program product.

BACKGROUND

In order to perform efficient management of a number of devices that are connected by a network, there are methods available for managing those devices in groups. Such group-based management methods include a static management method, in which a predetermined group structure is used, and a dynamic management method, in which groups are generated and deleted depending on the situation.

In the dynamic group management method, although it is possible to achieve flexible management depending on the situation, securing the scalability remains an issue.

BRIEF DESCRIPTION OF THE DRAWINGS

FIG. 1 is a block diagram of a communication system according to a first embodiment.

FIG. 2 is a block diagram of a communication control device according to the first embodiment.

FIG. 3 is a diagram illustrating an exemplary data structure of group information.

DETAILED DESCRIPTION

Figures 4, 5:
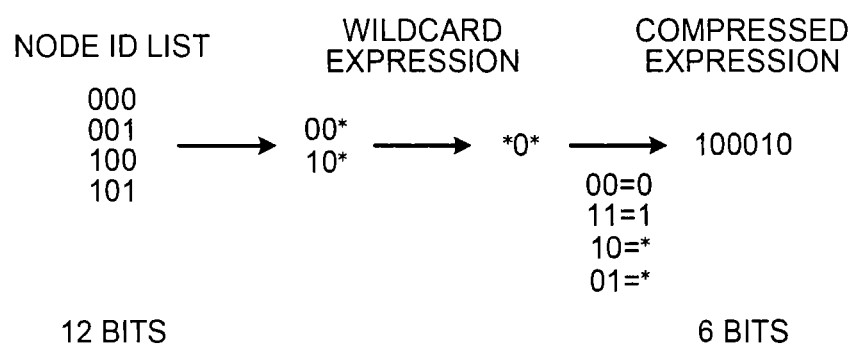
FIG. 4 is a diagram illustrating an exemplary data structure of the data stored in an address storage.
FIG. 5 is a diagram illustrating an exemplary compression method using a wildcard character.

According to an embodiment, a communication control device is connected to a plurality of communication devices and includes a group information storage, a compressed-information generator, and an output unit. The group information storage is configured to store group information containing a group ID for identifying a group and device IDs for identifying the communication devices belonging to the group. The compressed-information generator is configured to generate compressed information in which the device IDs included in the group information are compressed. The output unit is configured to output, when the group information is updated, to a plurality of communication devices including all of the communication devices identified by the device IDs included in the group information after updating and including one or more of the communication devices identified by the device IDs not included in the group information after updating, output information containing identification information for identifying the group after updating and compressed information in which the device IDs included in the group information after updating are compressed.

Preferred embodiments of a device according to the invention are described below in detail with reference to the accompanying drawings.

First Embodiment

As a dynamic group management method, a protocol is known in which, under a condition that a group management server and a plurality of nodes are connected by a network, the group management server performs communication partner authentication with the nodes using unicast communication and distributes group keys to the nodes with which the authentication is successful. In this method, the nodes belonging to the groups can be subjected to dynamic control by performing communication partner authentication and group key updating. However, in the case of simultaneously changing the groups for numerous nodes, the processing gets centered in the group management server. Meanwhile, the multicast technology is known in which the same information is delivered to a plurality of nodes. However, due to the issue of assigning multicast addresses, the multicast technology is ill-suited under a condition in which there is a possibility of a plurality of groups, such as in the case of dynamic group control of numerous devices. In this way, at the time of performing dynamic group control, securing the scalability remains an issue because of authentication and the method of data delivery. For that reason, under the condition in which an enormous number of nodes are present, it has been a difficult task to implement a system that performs dynamic group control.

In that regard, in a communication system according to a first embodiment, according to a group ID that is assigned in a dynamic manner to a communication device (hereinafter, called a node) by a communication control device, the group to which the concerned node belongs is decided. Herein, a group ID represents identification information that enables identification of a group. The information containing such group IDs is sent using multicast communication or broadcast communication. For that reason, the information containing group IDs may also possibly reach the nodes other than the target nodes for group changing. In the communication system according to the first embodiment, besides making use of the group IDs, a signature of the communication control device is added to the information in which device IDs (hereinafter, called node IDs) that enable identification of the target nodes for group changing are expressed in an efficient manner. That prevents falsification of group change commands issued in a dynamic manner. As a result of performing the operations explained above, dynamic group control can be performed while achieving scalability as well as safety.

In the communication system according to the first embodiment, each node has a corresponding node ID and a verification key of the communication control device registered therein in advance. When a node receives a group change command, it compares the information about the target node ID for updating specified in the received command with the corresponding node ID. If the corresponding node ID happens to be the target node ID for updating, then the node verifies the signature specified in the command. If the verification is successful, then the concerned node changes the group ID of the group to which it belongs to the group ID specified in the command.

Meanwhile, it is not always the case that each node has only one node ID assigned thereto. For example, each node can hold a plurality of node IDs depending on the intended use. In this case, each node that holds a plurality of node IDs performs comparison to check whether it is holding the node ID serving as a command target. If such a node ID is being held, then the concerned node performs identical operations as described above with respect to that node ID.

As described above, in the first embodiment, while performing dynamic group control, unlike in the conventional technology, it is neither necessary to send the group IDs using unicast communication nor necessary to newly perform authentication between a node and the communication control device. Moreover, a list of node IDs serving as command targets is expressed in an efficient manner. Hence, even if a command is issued with respect to numerous nodes, it becomes possible to particularly cut down the communication cost. Moreover, if the node IDs are assigned by taking into account the attributes such as the network configuration, the usage of nodes, node manufacturers, and installation locations of nodes (geographical location information); then it becomes possible to prevent a decline in the efficiency of the list of node IDs serving as command targets.

FIG. 1 is a block diagram illustrating an exemplary configuration of the communication system according to the first embodiment. As illustrated in FIG. 1, in the communication system according to the first embodiment, nodes $200a$ to $200f$ are connected to a communication control device 100 by a network 60. Herein, the network 60 can be any type of network such as the Internet. Moreover, each of the nodes $200a$ to $200f$ need not be directly connected to the communication control device 100.

Furthermore, the number of communication control devices 100 is not limited to one, and the configuration can be such that two or more communication control devices are installed. Since the nodes $200a$ to $200f$ have an identical configuration, they are sometimes simply referred to as nodes 200 in the following explanation. Meanwhile, the number of nodes 200 is not limited to six.

As illustrated in FIG. 1, in the first embodiment, the communication control device 100 sends a group change command to each node 200. A group change command contains, for example, information about the target node ID for updating, a group ID, and a signature.

FIG. 2 is a block diagram illustrating an exemplary configuration of the communication control device 100. As illustrated in FIG. 2, the communication control device 100 includes a signature key storage 121, a group information storage 122, an address storage 123, a receiver 101, a group information processor 102, an ID generator 103, a compressed-information generator 104, a signature generator 105, and an output unit 106.

The signature key storage 121 is used to store a signature key that is used in generating a signature. The group information storage 122 is used to store group information that contains group IDs and contains node IDs of the nodes 200 that belong to the groups identified by the group IDs. Thus, the group information storage 122 is used to store the group IDs in a corresponding manner with the node IDs of the nodes 200 that belong to the groups identified by the group IDs. FIG. 3 is a diagram illustrating an exemplary data structure of the group information. As illustrated in FIG. 3, each set of group information contains a group ID and one or more node IDs. Meanwhile, the data structure illustrated in FIG. 3 is only exemplary, and alternatively it is possible to use a data structure in a format other than the table format. Moreover, a particular node 200 may belong to a plurality of groups. In such a case, a plurality of group IDs is present corresponding to the node ID of that particular node 200.

Returning to the explanation with reference to FIG. 2, the address storage 123 is used to store the addresses serving as the output destinations of information that is output by the output unit 106. FIG. 4 is a diagram illustrating an exemplary data structure of the data stored in the address storage 123. As illustrated in FIG. 4, the address storage 123 is used to store data in which addresses and the node IDs associated to the respective addresses are held in a corresponding manner. Herein, an address is a multicast address used in sending information to the nodes 200 having the node IDs associated to that address. In the case of not using multicast communication (for example, in the case of using broadcast communication), the communication control device 100 can be configured to not include the address storage 123.

Returning to the explanation with reference to FIG. 2, the receiver 101 receives a variety of information from external devices such as the nodes 200. The receiver 101 receives, for example, a request for group control and information specifying the target for group control. A request for group control points to a request such as a new-group creation request or a group change request (to change the nodes 200 belonging to a group). Meanwhile, group control is not limited to the case in which a request for group control is received from an external device. Alternatively, the necessity of group control can be determined within the communication control device 100; and group control can be performed when determined to be necessary. Meanwhile, the receiver 101 sends the request for group control and the information specifying the target for group control (input information) to the group information processor 102.

The group information processor 102 performs operations to issue a group management command according to the input information. Firstly, the group information processor 102 determines whether or not it is necessary to generate a new group. If it is determined not necessary to generate a new group, then the group information processor 102 performs a group management operation described later.

If it is determined necessary to generate a new group, then the group information processor 102 requests the ID generator 103 to generate a group ID to be assigned to the new group. In response to the request, the ID generator 103 generates a new group ID. Herein, the ID generator 103 can generate the group ID by implementing an arbitrary method. For example, from among the methods such as the method in which a randomly-selected character string is set as the group ID or the method in which a character sting obtained by concatenating the IP address of the representative device of the group and the group attributes is set as the group ID; a suitable method can be decided depending on the intended use of the group.

The group information processor 102 refers to the generated group IDs and performs a group management operation described later. The group information processor 102 reads, from the group information storage 122, the group information containing suitable group IDs and lists of node IDs; and creates group IDs and lists of node IDs to be distributed. A group ID to be distributed points to the group ID of the group that considered for new group creation or group changing, and the node IDs to be distributed point to the node IDs of the nodes 200 belonging to the group having the concerned group ID.

The group information processor 102 further includes an assignor 102a that assigns node IDs to the nodes 200. As described above, if the node IDs are assigned by taking into account the attributes of the nodes 200 such as the configuration of the network 60, usage, manufacturers, and locations; then it becomes possible to enhance the efficiency (the compression efficiency) of the list of node IDs to be distributed. For example, in the case in which a manufacturer collectively shifts a plurality of identical nodes 200 to another group; if the manufacturer assigns mutually close values as the node IDs of the identical nodes 200, then it becomes possible to enhance the compression efficiency while implementing a compression method using a numerical range. Accordingly, the assignor 102a assigns the node IDs in such a way that the difference between a plurality of node IDs assigned to a plurality of nodes 200 having mutually similar or identical attributes is smaller than the difference between a plurality of node IDs assigned to a plurality of nodes 200 having mutually non-similar or non-identical attributes.

Returning to the explanation with reference to FIG. 2, the compressed-information generator 104 generates compressed information in which the list of node IDs to which group IDs are to be given is expressed in a compressed form. As far as the compression method is concerned, for example, it is possible to implement a compression method using wildcard characters, a compression method using a numerical range, or a compression method using the commonly-used compact code. However, the compression method is not limited to the methods mentioned herein. As long as the compression method enables unique decoding of the node IDs listed in the list of node IDs, any compression method can be implemented.

FIG. 5 is a diagram illustrating an exemplary compression method using a wildcard character. In the example illustrated in FIG. 5, a wildcard character "*" is used that is compatible with 0 as well as 1. In the case in which the list of node IDs (the node ID list) includes "000", "001", "100", and "101"; firstly, "000" and "001" are converted into a wildcard expression "00*". Then, "100" and "101" are converted into "10*". Subsequently, "00*" and "10*" are converted into "*0*". This operation is repeated until such conversion can no more be performed. In the example illustrated in FIG. 5, "*0*" is obtained as the final wildcard expression.

Herein, 0, 1, and * are associated in advance with bit strings. In the example illustrated in FIG. 5, bit strings "00", "11", "10", and "01" are associated to "0", "1", "*" and "*", respectively. As a result, from "*0*" that is obtained, a compression expression "100010" is obtained by concatenating the respective bit strings. That is, the node ID list that was expressed with at least 12 bits is compressed into 6-bit compressed information.

As an example of the compression method using a numerical range, there exists a method in which, when the node IDs listed in a list are numerically continuous such as "000", "001", "010", and "011", encoding is performed to obtain "000011". This method is effective in the case in which numerically continuous node IDs are specified.

Meanwhile, in the case in which performing the operations described above with respect to a complementary set of the set of node IDs listed in the node ID list enables the expression in a shorter bit string, the compressed information can be generated from the information indicating that the operations are performed with respect to a complementary set and from the information about implementing the abovementioned compression method with respect to the complementary set.

Returning to the explanation with reference to FIG. 2, the signature generator 105 calculates (generates) a signature using the signature key, which is stored in the signature key storage 121, with respect to the compressed information and the target group ID to be distributed.

Meanwhile, the group information processor 102 reflects, in the group information storage 122, the changes occurring in the group information. Herein, the changes in the group information include new addition of a group ID and a node ID list, deletion of a group ID and a node ID list, and update of the node ID list corresponding to a particular group ID.

When the group information is updated, the output unit 106 outputs, to the nodes 200 identified by all node IDs listed in the node ID list and to a plurality of nodes including one or more nodes 200 not listed in the node ID list, output information that contains identification information enabling identification of the updated groups; compressed information in which the node IDs included in the updated group information are compressed; and the signature. In this way, the output of the output unit 106 is allowed to also reach the nodes that are not targeted in group changing. Thus, as compared to the case in which the output of the output unit 106 is not allowed to reach such nodes, it becomes possible to reduce the calculation cost required for the output unit 106 to decide the output destination.

In the first embodiment, the group IDs are used as the identification information. Meanwhile, the output unit 106 outputs the output information to such a set of nodes 200 that are managed independently of the groups and that include at least all of the nodes 200 of the updated groups. Herein, a set of nodes 200 represents a collection of a plurality of nodes 200, and is not necessarily consistent with the groups having group IDs assigned thereto. Examples of a set of nodes 200 include a set of nodes 200 that receive data in particular multicast communication, and a set of nodes 200 that receive data in broadcast communication, that is, a set of all nodes 200. For example, the output unit 106 can send the output information to the set of nodes 200 listed in the node ID list or to the groups using one or more instances of multicast communication or broadcast communication. In the case of sending the output information using multicast communication, the output unit 106 sends the output information to, for example, the destinations in the form of one or more addresses (multicast addresses), from among the addresses stored in the address storage 123, that are associated to the nodes of the target node IDs for distribution. In the case in which a particular node ID held by the nodes 200 has a plurality of group IDs assigned thereto; the output unit 106 can send, to the target nodes 200 for updating, the output information containing information that facilitates identification of the target group ID for updating. The information facilitating identification of the group ID points to the information indicating the intended use or the attribute of the group managed using that group ID, or the information indicating the actual target group ID for updating, or the information indicating the high-order bits of the target group ID for updating, or the information indicating that the target group ID for updating does not exist and a new group ID is to be assigned. As a result of adding the information that facilitates the identification of the group ID to the output information, it becomes possible to alleviate the operation in which the nodes identify the target group ID for updating.

Figure 6:
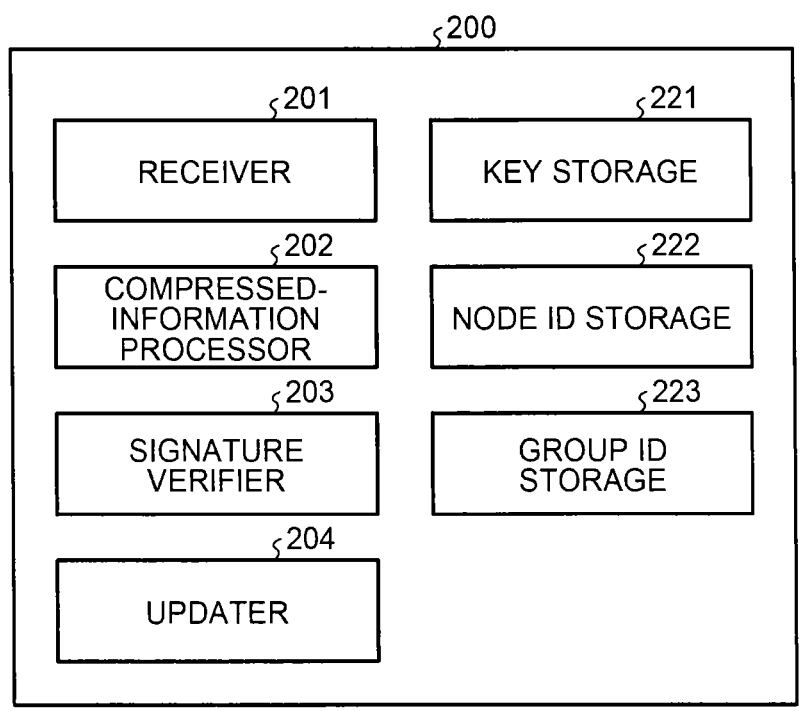
FIG. 6 is a block diagram of a node according to the first embodiment.

FIG. 6 is a block diagram illustrating an exemplary configuration of the node 200. As illustrated in FIG. 6, the node 200 includes a key storage 221, a node ID storage 222, a group ID storage 223, a receiver 201, a compressed-information processor 202, a signature verifier 203, and an updater 204.

The key storage 221 is used to store a verification key of the communication control device 100. The node ID storage 222 is used to store the node ID assigned to the corresponding node 200. The group ID storage 223 is used to store the group ID of the group to which the corresponding node 200 belongs.

The receiver 201 receives a variety of information from external devices such as the communication control device 100 and the other nodes 200. For example, from the communication control device 100, the receiver 201 receives information containing the compressed information, the group ID, and the signature. Moreover, the receiver 201 receives the output information using multicast communication or broadcast communication.

The compressed-information processor 202 refers to the node IDs, which are stored in the node ID storage 222, and the received compressed information, and determines whether or not the corresponding node ID is a target for the group updating operation. The compressed-information processor 202 implements a decoding method corresponding to the compression method implemented by the compressed-information generator 104 of the communication control device 100, and decodes the list of node IDs from the compressed information. Then, if the decoded node ID list includes the corresponding node ID, the compressed-information processor 202 determines that the corresponding node ID is a target for the group updating operation. However, if the corresponding node ID is not a target for the group updating operation, then the node 200 ends the operations.

When the corresponding node ID is a target for the group updating operation, the signature verifier 203 refers to the verification key stored in the key storage 221, the compressed information, and the group ID; and determines whether or not the signature is valid. If the signature is not valid, then the concerned node 200 ends the operations.

On the other hand, if the signature is valid, then the updater 204 updates the group ID stored in the group ID storage 223 with the group ID included in the output information. In the case in which the information facilitating the identification of the target group ID for updating is also received, the updater 204 can refer to that information and identify the target group ID for updating.

Meanwhile, each storage mentioned above can be configured using any commonly-used storage medium such as an HDD (Hard Disk Drive), an optical disk, a memory card, and a RAM (Random Access Memory).

Figure 7:
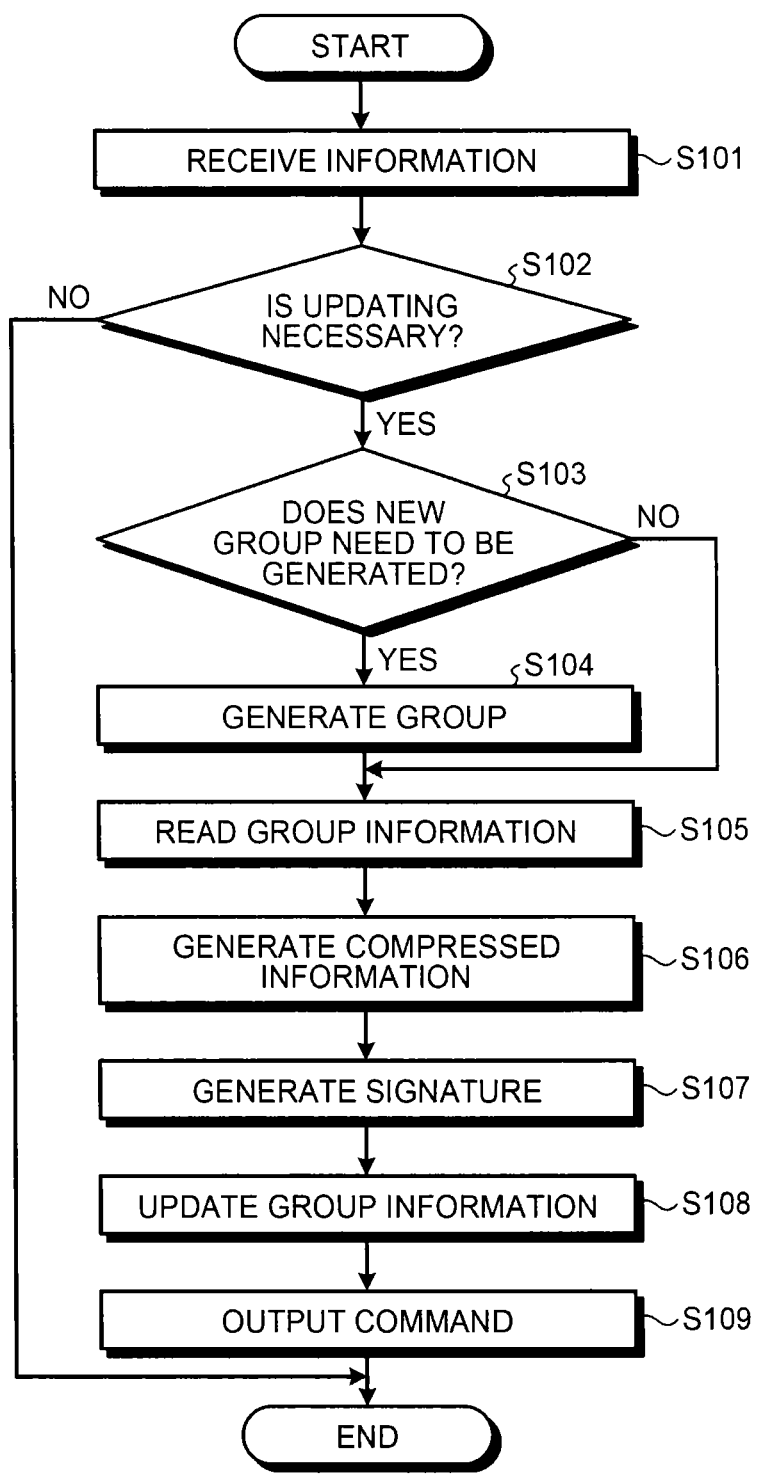
FIG. 7 is a flowchart for explaining an update requesting operation according to the first embodiment.

Given below is the explanation of the group management operation performed in the communication system that is configured in the abovementioned manner according to the first embodiment. In the following explanation, the group management operation is explained by dividing it into an update requesting operation (FIG. 7), which is performed by the communication control device 100, and a group information updating operation (FIG. 8), which is performed by the node 200. FIG. 7 is a flowchart for explaining an example of the update requesting operation according to the first embodiment.

The receiver 101 receives information from external devices (Step S101). The group information processor 102 refers to the received information and determines whether or not the groups need to be updated (Step S102). For example, if a request for group control and input information specifying the target for group control is received, then the group information processor 102 determines that the groups need to be updated.

If there is no need to update the groups (No at Step S102), it marks the end of the update requesting operation. However, if the groups need to be updated (Yes at Step S102), then the group information processor 102 further determines whether or not a new group needs to be generated (Step S103). For example, if the request for group control indicates new creation of a group, then the group information processor 102 determines that a new group needs to be generated.

If a new group needs to be generated (Yes at Step S103), then the group information processor generates a new group (Step S104). For example, the group information processor 102 requests the ID generator 103 to generate a group ID to be assigned to a new group.

If a new group need not be generated (No at Step S103) or after the generation of a new group, the compressed-information generator 104 reads the group information of the target group for processing from the group information storage 122 (Step S105). Then, the compressed-information generator 104 generates compressed information from the node IDs specified in the group information that has been read (Step S106).

The signature generator 105 generates a signature, using the signature key stored in the signature key storage 121, with respect to the generated compressed information and the target group ID for processing (Step S107).

The group information processor 102 updates the group information stored in the group information storage 122 (Step S108). For example, while updating the groups, the group information processor 102 updates the group information stored in the group information storage 122 with the group information in which the node IDs specified as the targets for group control are newly associated to the group ID of the target group for updating. When a new group is generated, the group information processor 102 stores, in the group information storage 122, the group information in which the node IDs specified as the targets for group control are newly associated to the group ID generated at Step S104.

The output unit 106 uses, for example, multicast communication and outputs the output information that contains the group ID included in the updated group information; the compressed information in which the node IDs included in the updated group information are compressed; and the signature (Step S109).

Figure 8:
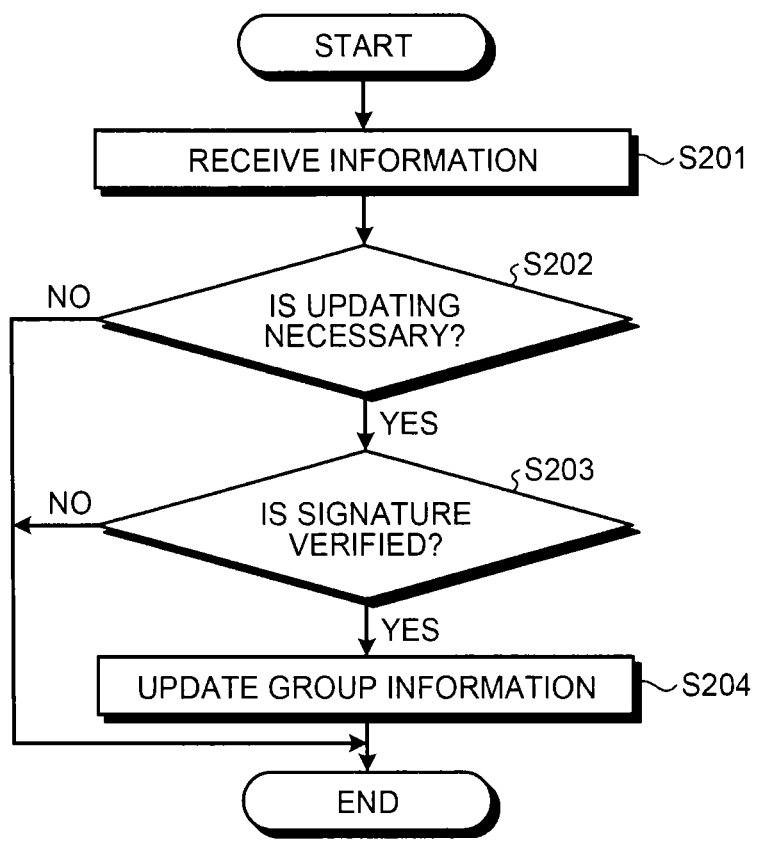
FIG. 8 is a flowchart for explaining a group information updating operation according to the first embodiment.

FIG. 8 is a flowchart for explaining an example of the group information updating operation according to the first embodiment.

The receiver 201 of the node 200 receives information from external devices (Step S201). For example, the receiver 201 receives the output information that has been sent using multicast communication. Meanwhile, if the destination address of the received output information does not match with the multicast address assigned to the corresponding node 200, then the receiver 201 may destroy the received information and end the operations.

The compressed-information processor 202 refers to the received information and determines whether or not it is necessary to update the groups (Step S202). For example, in the received output information, if the multicast address assigned to the corresponding node 200 is specified, then the compressed-information processor 202 decodes the compressed information included in the received output information. Then, if the corresponding node ID is listed in the node ID list obtained by means of decoding, the compressed-information processor 202 determines that updating needs to be done.

If updating need not be done (No at Step S202), then the node 200 ends the group information updating operation. However, if updating is required (Yes at Step S202), then the signature verifier 203 refers to the verification key, the compressed information, and the group ID; and determines whether or not the signature included in the output information is valid (Step S203). If the signature is not valid (No at Step S203), the node 200 ends the group information updating operation.

On the other hand, if the signature is valid (Yes at Step S203), then the updater 204 updates the group ID stored in the group ID storage 223 with the group ID included in the output information (Step S204).

In this way, in the communication system according to the first embodiment, the communication control device 100 sends the output information, which contains the updated group ID, using multicast communication or broadcast communication. Then, the node 200 refers to the output information and determines whether or not the group to which it belongs needs to be updated. Only if the group needs to be updated, the node 200 updates the group to which it belongs. As a result, it becomes possible to perform dynamic group management while securing the scalability.

Second Embodiment

Figure 9:
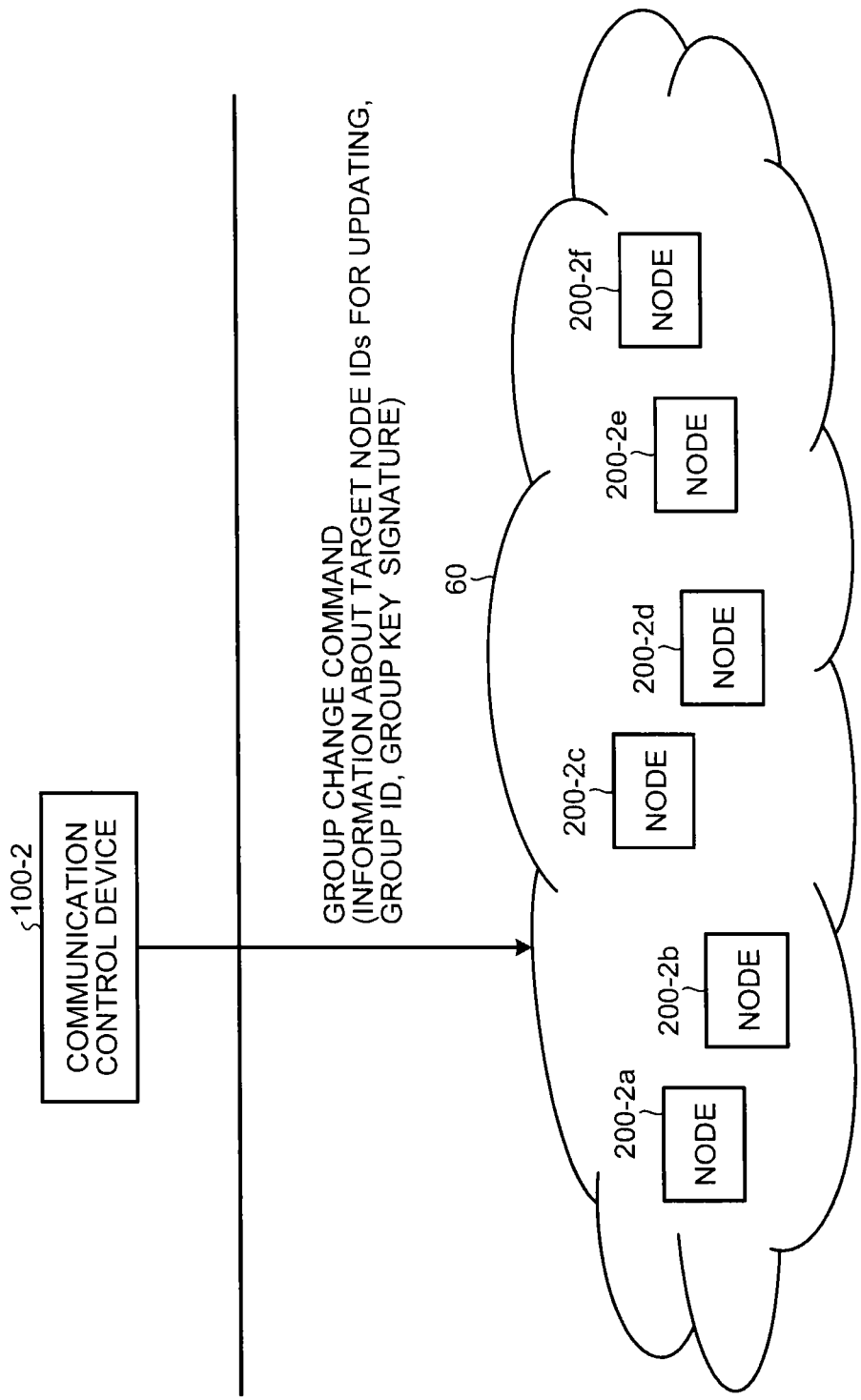
FIG. 9 is a block diagram of a communication system according to a second embodiment.

FIG. 9 is a block diagram illustrating an exemplary configuration of a communication system according to a second embodiment. As illustrated in FIG. 9, in the communication system according to the second embodiment, nodes 200-2a to 200-2f are connected to a communication control device 100-2 by the network 60.

The number of communication control devices 100-2 is not limited to one, and the configuration can be such that two or more communication control devices 100-2 are installed. Since the nodes 200-2a to 200-2f have an identical configuration, they are sometimes simply referred to as nodes 200-2 in the following explanation. Meanwhile, the number of nodes 200-2 is not limited to six.

As illustrated in FIG. 9, in the second embodiment, a group change command specifies a group key in addition to specifying information indicating the target node IDs for updating, the group ID, and the signature.

Figure 10:
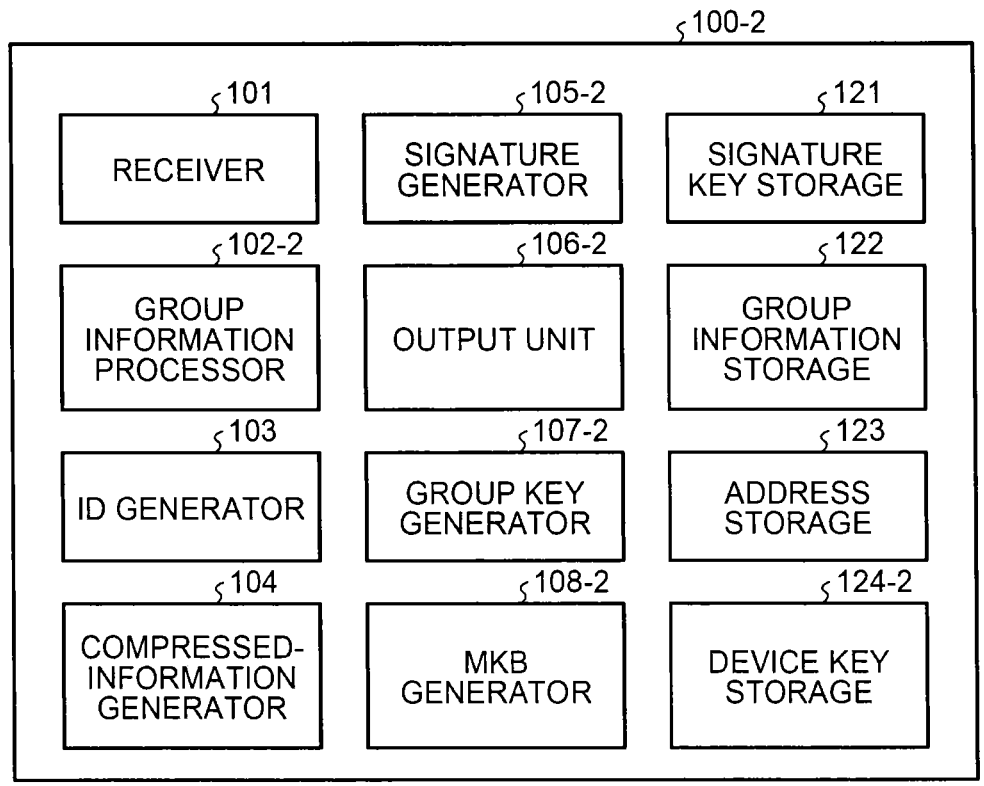
FIG. 10 is a block diagram of a communication control device according to the second embodiment.

FIG. 10 is a block diagram illustrating an exemplary configuration of the communication control device 100-2. As illustrated in FIG. 10, the communication control device 100-2 includes the signature key storage 121, the group information storage 122, the address storage 123, a device key storage 124-2, the receiver 101, a group information processor 102-2, the ID generator 103, the compressed-information generator 104, a signature generator 105-2, an output unit 106-2, a group key generator 107-2, and an MKB (media key block) generator 108-2.

As compared to the first embodiment, the second embodiment differs in the way that the functions of the group information processor 102-2, the signature generator 105-2, and the output unit 106-2 are different, and that the device key storage 124-2, the group key generator 107-2, and the MKB generator 108-2 are added. Aside from that, the configuration and the functions are identical to FIG. 2, which is a block diagram of the communication control device 100 according to the first embodiment. Regarding those constituent elements, the same reference numerals are used, and the relevant explanation is not repeated.

The device key storage 124-2 is used to store a list of device keys that are assigned to the nodes 200-2 (i.e., used to store a device key list). Herein, the device keys can be stored in an arbitrary manner. As described later, the device keys can be stored using a tree structure.

The group key generator 107-2 generates a group keys that are used by the nodes 200-2 belonging to the respective groups. A group key is distributed to each node 200-2 belonging to the corresponding group, and is used in encoding the communication among the nodes 200-2 belonging to that group and in authenticating the fact that the nodes 200-2 belong to that group. Thus, each group key needs to be kept confidential from the devices not belonging to the corresponding group.

The MKB generator 108-2 generates an MKB which represents confidential information that is derivable by only the nodes 200-2 belonging to the concerned group. For example, the MKB generator 108-2 receives input of the list of device keys held by the nodes 200-2 belonging to the concerned group as well as receives input of the group key. Then, from the device key list and the group key that are received, the MKB generator 108-2 generates an MKB in such a way that only the devices holding a device key listed in the device key list can obtain the group key. As far as the methods of generating an MKB are concerned; the Complete Subtree method, the Subset Difference method, and the Logical Key Hierarchy method are already known methods, and any one of such methods can be implemented.

The signature generator 105-2 uses the signature key and generates a signature with respect to the compressed information, the target group ID for distribution, and the MKB.

Given below is the explanation about the function of the group information processor 102-2. In an identical manner to the first embodiment, the communication control device 100-2 sends, to the group information processor 102-2, the information (the input information) received by the receiver 101. Then, in an identical manner to the first embodiment, from the input information, the group information processor 102-2 determines whether or not it is necessary to generate a new group. If it is determined not necessary to generate a new group, then the group information processor 102-2 performs a group management operation described later. If it is determined necessary to generate a new group, then the group information processor 102-2 requests the ID generator 103 to generate a new group ID, and performs the group management operation described later.

Subsequently, in an identical manner to the first embodiment, the group information processor 102-2 reads, from the group information storage 122, the group information containing suitable group IDs and lists of node IDs; and creates group IDs and lists of node IDs to be distributed.

Then, according to the list of node IDs to which a group ID is to be distributed, the group information processor 102-2 reads the corresponding device key list from the device key storage 124-2. Moreover, the group information processor 102-2 requests the group key generator 107-2 to generate a group key.

Then, the group information processor 102-2 inputs the device key list and the generated group key to the MKB generator 108-2. Then, the MKB generator 108-2 generates an MKB in such a way that only the devices holding a device key listed in the device key list can obtain the group key. Herein, in an identical manner to the method of assigning node IDs, if the device keys are assigned by taking into account the attributes such as the network configuration, the usage of nodes, and the manufacturers of nodes; then it becomes possible to prevent a decline in the efficiency of the MKB serving as the command target.

The group information processor 102-2 obtains, from the compressed-information generator 104, the compressed information in which the node IDs to which the group ID is to be distributed are compressed.

When the device keys are represented in the form of a tree structure, the information on the heights in the tree corresponding to the device keys used in encoding can be treated as the compressed information. In this case, the target node IDs for distribution cannot be uniquely identified from the compressed information. However, each node 200-2 can determine whether or not it is a target of the group change command through trial and error for the number of times equal to at most the number of device keys held therein.

Meanwhile, the compression method is not limited to these methods, and it is possible to implement any uniquely-decodable compression method or any compression method that is not uniquely decodable but that facilitates identification of the device key used in MKB encoding.

Meanwhile, if the targets for group operations need to be kept completely confidential, then a bit string not holding any information can be assigned as the compressed information. In this case, the target node IDs for distribution cannot be uniquely identified from the compressed information. However, if m represents the number of device keys used in MKB generation and if n represents the number of device keys held by each device, then each device can perform trial and error for at most m×n number of times and determine whether or not it is a target of the group change command.

The group information processor 102-2 requests the signature generator 105-2 to generate a signature, using the signature key, with respect to the compressed information, the target group ID for processing, and the MKB.

The group information processor 102-2 reflects, in the group information storage 122, the changes occurring due to the updating operation. Herein, in an identical manner to the first embodiment, the changes include new addition of a group ID, a node ID list, and a group key; deletion of a group ID, a node ID list, and a group key; and update of the node ID list and the group key corresponding to a particular group ID.

The output unit 106-2 outputs, to the nodes 200 identified by all node IDs listed in the node ID list and to a plurality of nodes including one or more nodes 200 not listed in the node ID list, output information that contains the compressed information, the group ID, the MKB, and the signature. In this way, the output of the output unit 106-2 is allowed to also reach the nodes that are not targeted in group changing. Thus, as compared to the case in which the output of the output unit 106-2 is not allowed to reach such nodes, it becomes possible to reduce the calculation cost required for the output unit 106-2 to decide the output destination. A plurality of nodes 200 serving as the output destinations of the output unit 106-2 represent a set of nodes 200 that are managed independently of the groups. Thus, the output unit 106-2 outputs the output information to a set of nodes 200 including at least all of the nodes 200 of the updated groups.

Herein, a set of nodes 200 represents a collection of a plurality of nodes 200 and is not necessarily consistent with the groups having group IDs assigned thereto. Examples of a set of nodes 200 include a set of nodes 200 that receive data in particular multicast communication, and a set of nodes 200 that receive data in broadcast communication, that is, a set of all nodes 200.

In an identical manner to the first embodiment, the output information can be output to the set of nodes 200 including all updated nodes 200 using one or more instances of multicast communication or broadcast communication.

Figure 11:
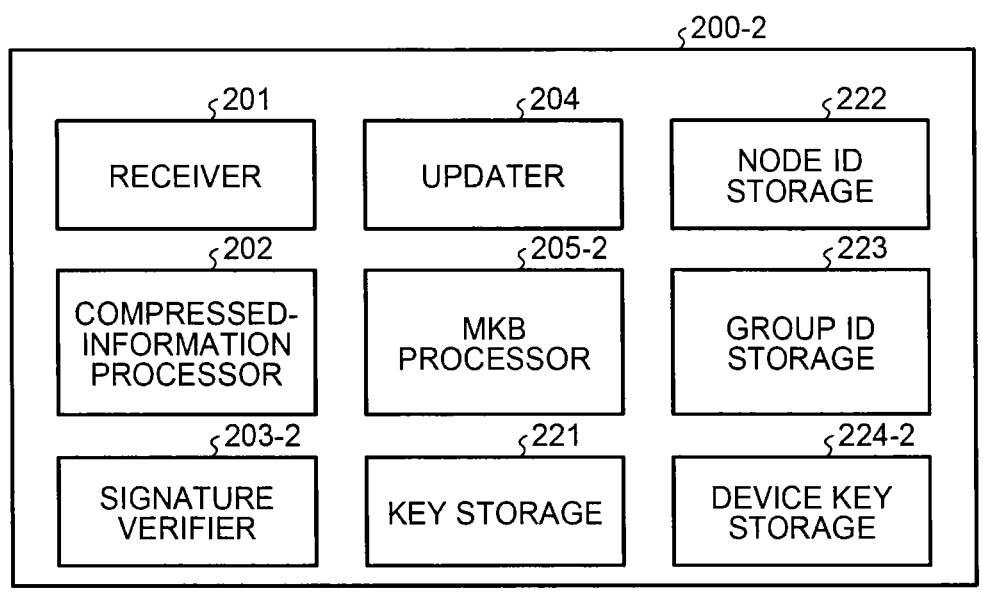
FIG. 11 is a block diagram of a node according to the second embodiment.

FIG. 11 is a block diagram illustrating an exemplary configuration of the node 200-2 according to the second embodiment. As illustrated in FIG. 11, the node 200-2 includes the key storage 221, the node ID storage 222, the group ID storage 223, a device key storage 224-2, the receiver 201, the compressed-information processor 202, a signature verifier 203-2, the updater 204, and an MKB processor 205-2.

As compared to the first embodiment, the second embodiment differs in the way that the function of the signature verifier 203-2 is different, and that the device key storage 224-2 and the MKB processor 205-2 are added. Aside from that, the configuration and the functions are identical to FIG. 6, which is a block diagram of the node 200 according to the first embodiment. Regarding those constituent elements, the same reference numerals are used, and the relevant explanation is not repeated.

The device key storage 224-2 is used to store the device key assigned to the node 200. The MKB processor 205-2 generates a group key by referring to the device key, which is stored in the device key storage 224-2, and the MKB. The signature verifier 203-2 determines whether or not the signature is valid by referring to the verification key, the compressed information, the group ID, and the MKB.

In an identical manner to the first embodiment, the compressed-information processor 202 refers to the corresponding node ID, which is stored in the node ID storage 222, and the received compressed information; and determines whether or not the corresponding node ID is a target for the group updating operation. If the corresponding node ID is not a target for the group updating operation, then the operations are ended.

If the corresponding node ID is a target for the group updating operation or is likely to be a target for the group updating operation, then the signature verifier 203-2 refers to the verification key of the communication control device 100-2 as stored in the key storage 221, the compressed information, the group ID, and the MKB; and determines whether or not the signature is valid. If the signature is not valid, then the operations are ended.

If the verification of the signature is successful, then the MKB processor 205-2 receives input of the device key, which is stored in the device key storage 224-2, and the MKB. If the node 200-2 is a command target, then the MKB processor 205-2 can correctly process the MKB and thus obtain the group key. On the other hand, if the node 200-2 is not a command target, then the MKB processor 205-2 happens to obtain an improper group key or error information. With that, the terminals that are not command targets can be prevented from being added in the group. Meanwhile, as against a single node ID assigned thereto, the node 200-2 may have a combination of a plurality of device keys assigned thereto. In this case, the information that facilitates identification of the device key obtained by the compressed-information processor 202 can also be input to the MKB processor 205-2. Herein, the information facilitating identification of the device key points to the information about the intended use or the attributes of the device key, or the ID information that enables identification of the device key. As a result of adding the information that facilitates identification of the device key, it becomes possible to cut down the cost required for the operation of selecting the device key that should be used.

If the correct group is obtained, then the updater 204 updates the group ID stored in the group ID storage 223 with the target group ID for updating, and ends the operations. Meanwhile, the configuration can be such that the obtained group key can be stored in the key storage 221.

First Modification Example

In the embodiments described above, as the identification information enabling identification of the groups, the group IDs themselves are included in the output information. In this case, the output information gets sent also to the nodes 200 that belong to the groups other than the target groups for updating. Hence, the group IDs cannot be kept confidential. In a first modification example, an MKB corresponding to a group keys and a group IDs is generated and included in the output information. That is, an MKB is used as the identification information that enables identification of a group. Meanwhile, the group ID is removed from the output information. As a result, the target group ID for processing can be kept confidential from the outside groups other than the concerned group. That enables achieving enhancement in the safety level.

Second Modification Example

Figure 12:
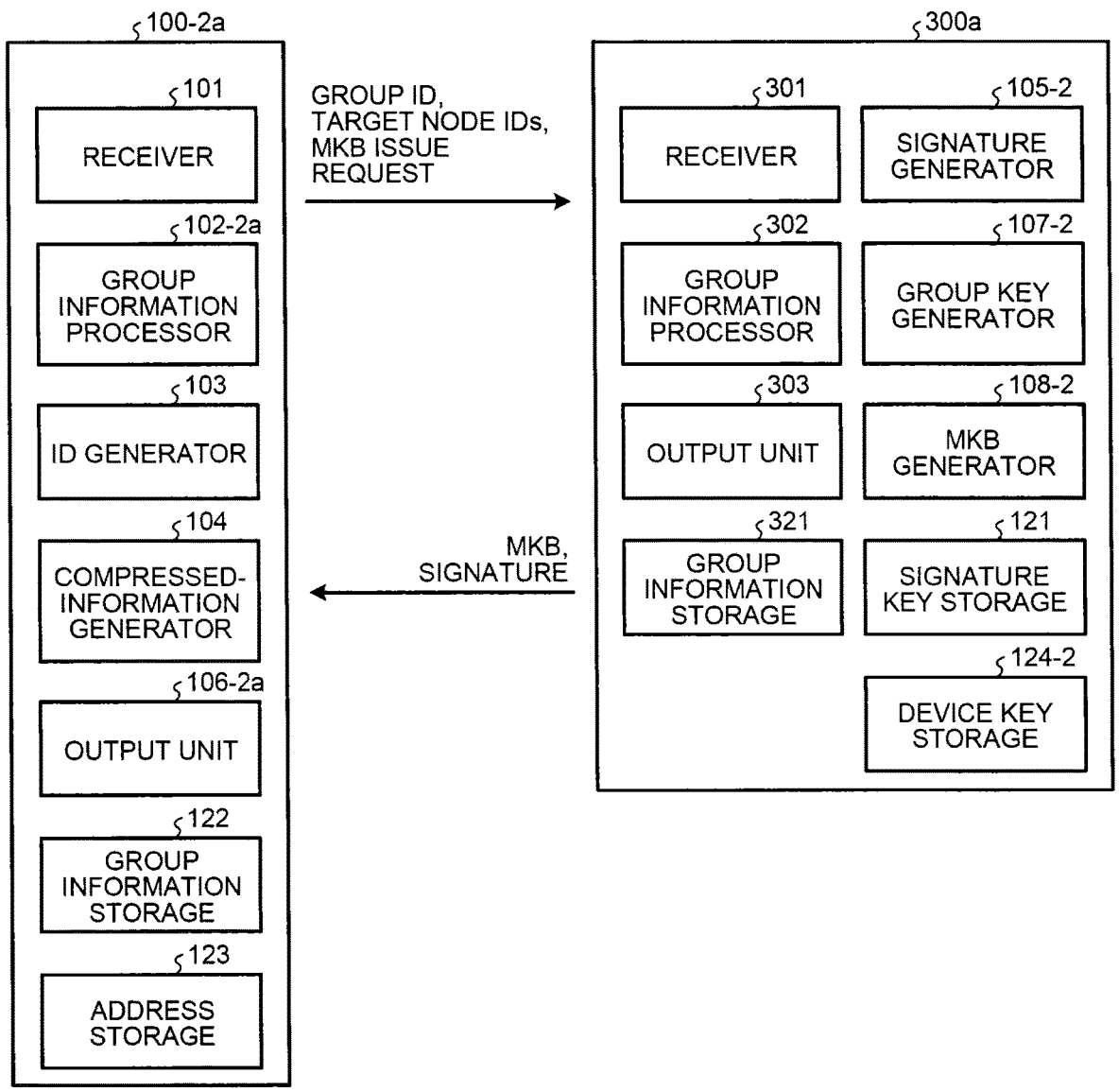
FIG. 12 is a block diagram of a communication control device and a management device according to a second modification example.

In a second modification example, the functions of the communication control device 100 are separated in such a way that the information which needs to be managed in confidence is managed in another device. That enables achieving enhancement in the safety level. FIG. 12 is a block diagram illustrating an exemplary configuration of a communication control device 100-2a and a management device 300a according to the second modification example.

For example, as illustrated in FIG. 12, the functions can be separated between the communication control device 100-2a and the management device 300a in such a way that the communication control device 100-2a manages groups and issues commands, while the management device 300a issues group keys and generates MKBs.

In the communication control device 100-2a, a group information processor 102-2a and an output unit 106-2a are different as compared to FIG. 10. Moreover, the communication control device 100-2a includes the group information storage 122, the address storage 123, the receiver 101, the ID generator 103, the compressed-information generator 104, and the output unit 106 that have identical functions to FIG. 10. Regarding those constituent elements, the same reference numerals are used, and the relevant explanation is not repeated.

The group information processor 102-2a performs an identical operation to the operation performed by the group information processor 102-2 illustrated in FIG. 10; creates the target group ID for distribution and the list of node IDs; issues an MKB issue request; and sends the created list to the output unit 106-2a. Then, the output unit 106-2a sends, to the management device 300a, the group ID received from the group information processor 102-2a, the target node IDs, and the MKB issue request. The group information processor 102-2a receives the MKB and the signature from the receiver 101; decides on the information to be output by performing identical operations to the operations illustrated in FIG. 10; and outputs the information using the output unit 106-2a.

The management device 300a includes a receiver 301, the signature key storage 121, the device key storage 124-2, the signature generator 105-2, an output unit 303, the group key generator 107-2, the MKB generator 108-2, a group information storage 321, and a group information processor 302. The functions identical to FIG. 10 are referred to by the same reference numerals and the relevant explanation is not repeated.

The group information storage 321 is used to store group information in an identical manner to the group information storage 122. Herein, the group information storage 321 can be used to store the information sent using the MKB, such as the group ID and the group key. When the group ID and the list of target node IDs are received from the receiver 301, the group information processor 302 generates the MKB and the signature in an identical manner to the group information processor 102-2. The output unit 303 outputs a variety of information to the communication control device 100-2a. Meanwhile, the communication control device 100-2 and the management device 300a can communicate using an arbitrary communication method. For example, if the communication control device 100-2 and the management device 300a are configured to communicate using a dedicated communication line, it is possible to achieve further enhancement in the safety level.

In the second modification example, the communication control device 100-2 sends the group ID and the list of node IDs serving as command issuing targets to the management device 300a, and requests the management device to issue an MKB. Based on the node IDs listed in the node ID list, the management device 300a reads the corresponding device key from the device key storage 124-2. The group key generator 107-2 generates a group key. The MKB generator 108-2 derives the MKB from the device key and the group key. The signature generator 105-2 derives the signature from the MKB and from the signature key that is stored in the signature key storage 121. The output unit 303 sends the MKB and the signature to the communication control device 100-2. The communication control device 100-2 outputs, to the node 200, a command including the compressed information serving as the command target, the MKB, and the signature.

As a result of having such a configuration, even if the communication control device 100-2 comes under attack, it becomes possible to protect the information that needs to be managed in confidence from the system perspective.

Meanwhile, although not illustrated in FIG. 12, the management device 300a can be configured to send the group key to the communication control device 100-2a. Then, using the received group key, the communication control device 100-2a can perform group authentication with respect to the nodes 200 belonging to the concerned group, and can perform confidential communication using the group key.

Figure 13:
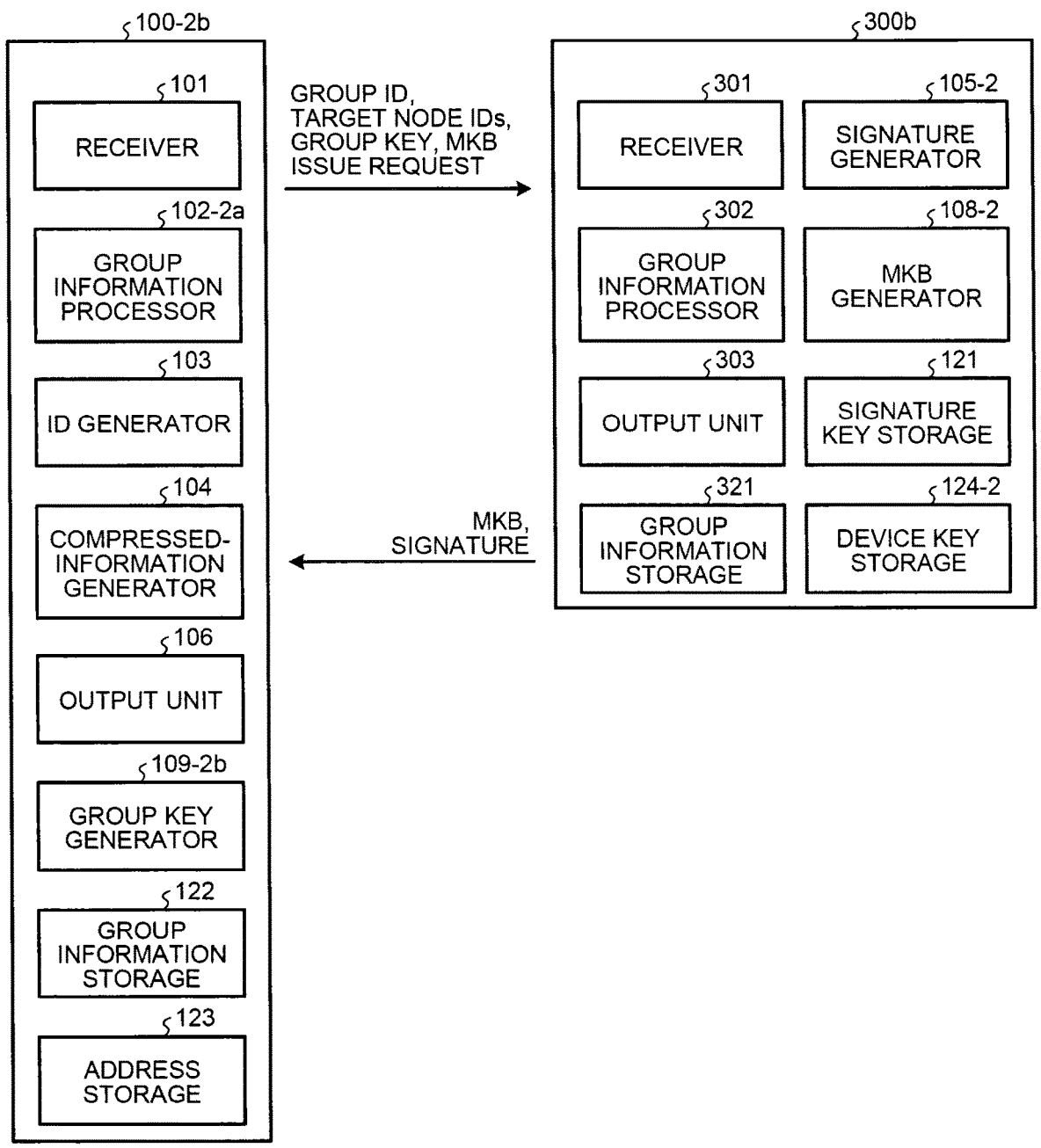
FIG. 13 is a block diagram of a communication control device and a management device according to the second modification example.

Moreover, as illustrated in FIG. 13, a communication control device 100-2b can be configured to have the function of deciding the group key. That is, the configuration can be such that the group key generator 107-2 is deleted from a management device 300b, and the communication control device 100-2b includes a group key generator 109-2b having the same function as the group key generator 107-2.

Third Embodiment

Figure 14:
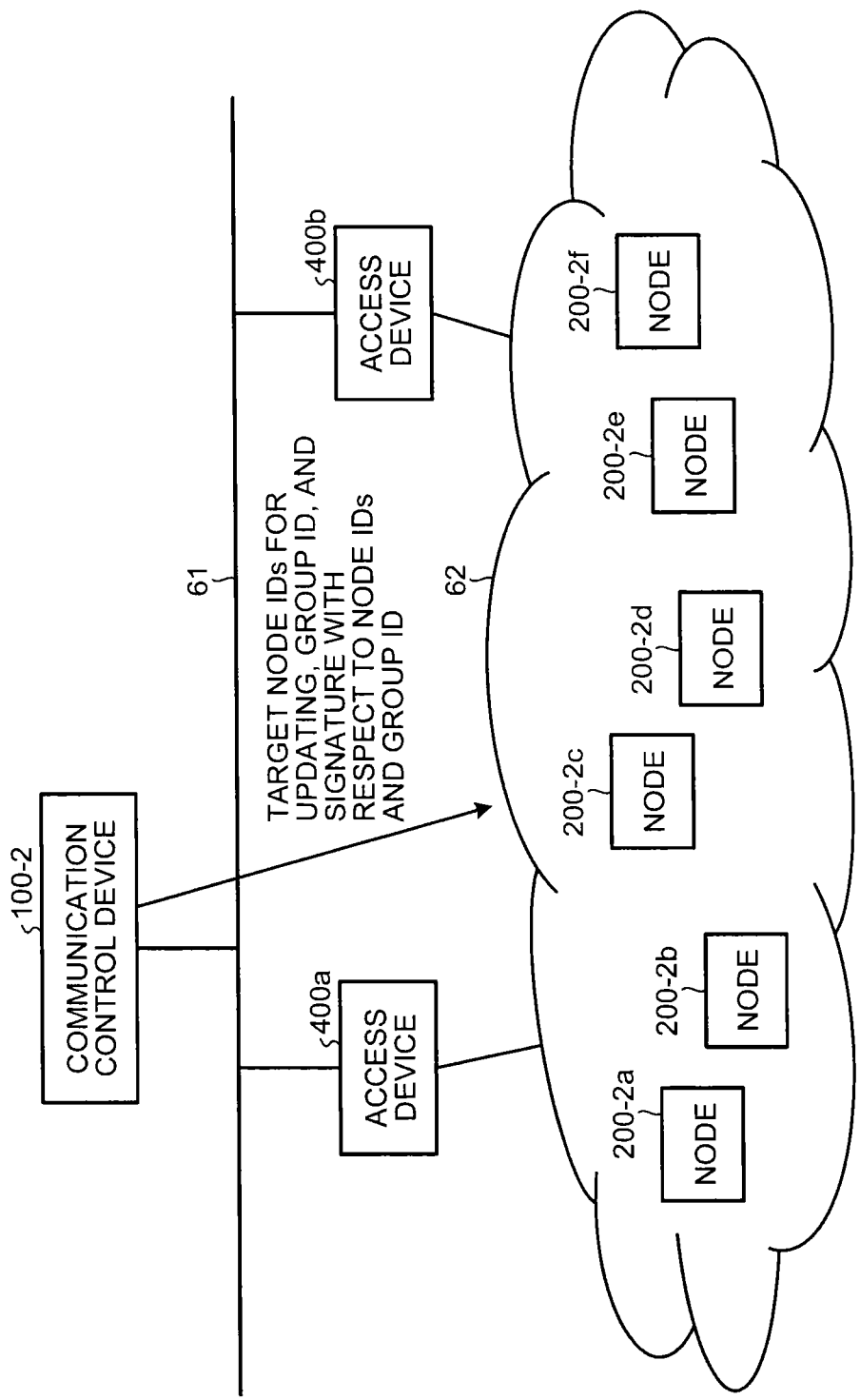
FIG. 14 is a block diagram of a communication system according to a third embodiment.

FIG. 14 is a block diagram illustrating an exemplary configuration of a communication system according to a third embodiment. As illustrated in FIG. 14, in the communication system according to the third embodiment, the nodes 200-2a to 200-2f are connected by a meshed network 62 using wireless communication or wired communication. Moreover, the nodes 200-2a to 200-2f, which constitute the meshed network 62, are connected to the communication control device 100-2 by a network 61 via access devices 400a and 400b. Herein, the network 61 can be any type of network such as the Internet.

Furthermore, the number of communication control devices 100-2 is not limited to one, and the configuration can be such that two or more communication control devices 100-2 are installed. Since the nodes 200-2a to 200-2f have an identical configuration, they are sometimes simply referred to as nodes 200-2 in the following explanation. Similarly, since the access devices 400a and 400b have an identical configuration, they are sometimes simply referred to as access devices 400.

Moreover, there are also times when the node 200-2 doubles as the access device 400. Furthermore, the number of meshed networks 62 including the nodes 200-2 is not limited to one, and it is possible to have a plurality of meshed networks 62. Moreover, the number of access devices 400 in a single meshed network 62 is not limited to one. As long as at least a single access device 400 is installed, it serves the purpose.

The communication control device 100-2 has an identical configuration to the configuration according to the second embodiment. Regarding that configuration, the same reference numerals are used, and the relevant explanation is not repeated. Moreover, in an identical manner to the second modification example, the communication control device 100-2 can be implemented using a plurality of devices. Furthermore, according to an identical method to the second embodiment, the communication control device 100-2 composes a command and sends it to the access device 400 so that the command is sent to the node 200-2 serving as the command target. That is, the communication control device 100-2 sends the command to the node 200-2 via the access device 400.

The node 200-2 has an identical configuration to the configuration according to the second embodiment. Regarding that configuration, the same reference numerals are used, and the relevant explanation is not repeated. The node 200-2 performs communication via the other nodes 200-2 constituting the meshed network 62 or via the access device 400.

Meanwhile, in the third embodiment, the network configuration illustrated in FIG. 14 is implemented for the communication control device 100-2 and the node 200-2 according to the second embodiment. However, alternatively, the network configuration illustrated in FIG. 14 can also be implemented for the communication control device 100 and the node 200 according to the first embodiment.

Figure 15:
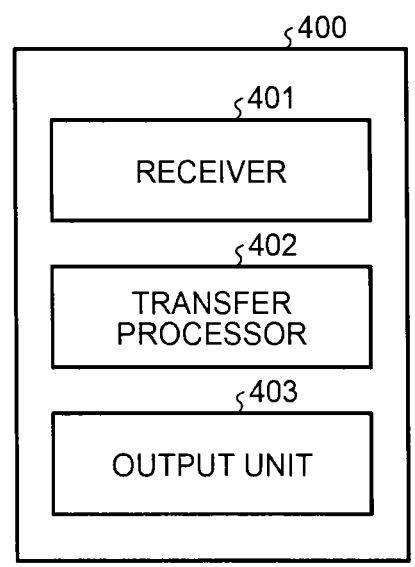
FIG. 15 is a block diagram of an access device according to the third embodiment.

FIG. 15 is a block diagram illustrating an exemplary configuration of the access device 400. Herein, the access device 400 includes a receiver 401, a transfer processor 402, and an output unit 403.

The receiver 401 receives a variety of information from the meshed network 62 or from the network 61 to which the communication control device 100-2 is connected. The transfer processor 402 determines the transfer destination of the information received by the receiver 401. Based on the determination result of the transfer processor 402, the output unit 403 outputs the received information to the access device 400 or the meshed network 62. Meanwhile, the access device 400 can have the same functions as the node 200-2.

Third Modification Example

Figure 16:
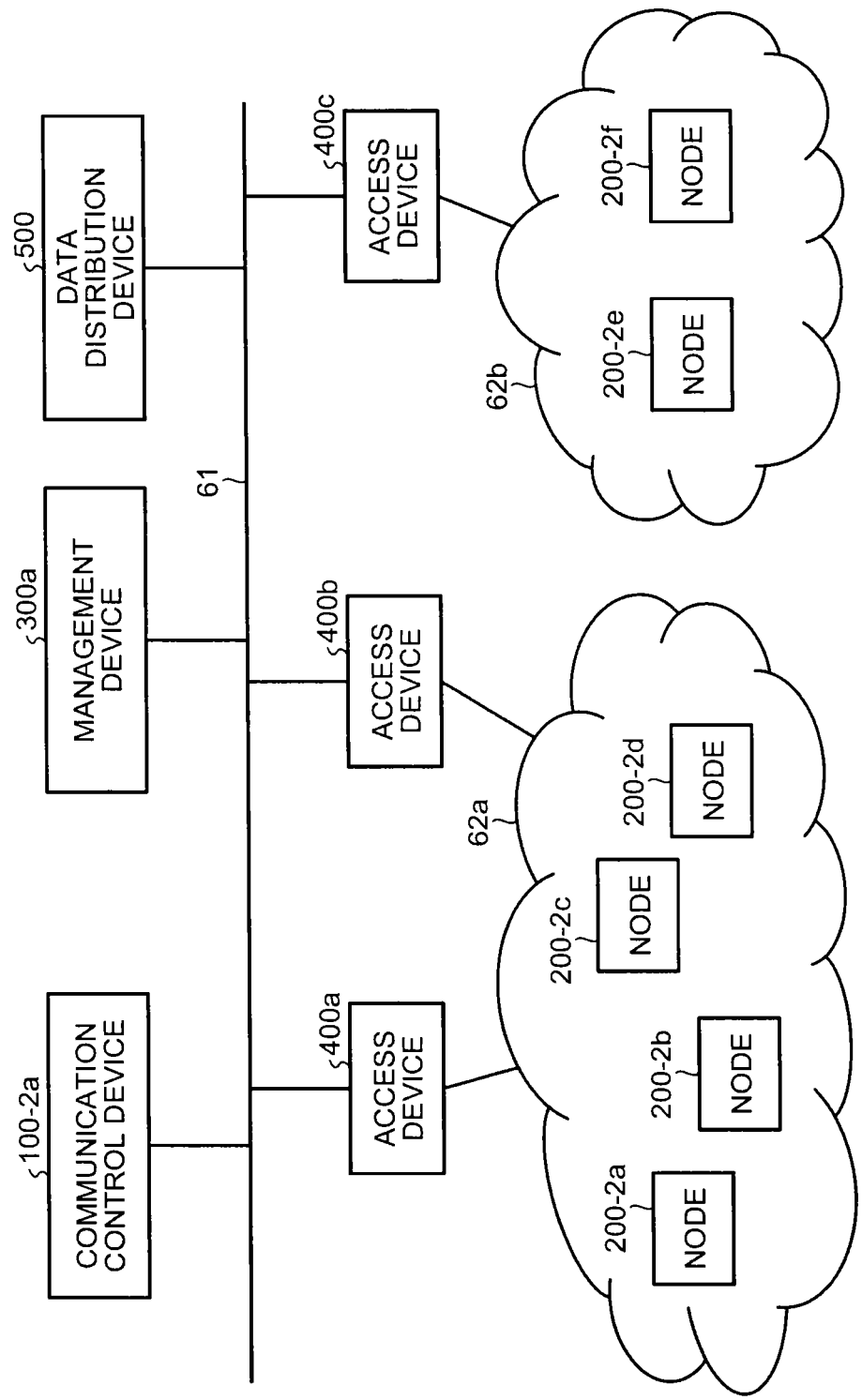
FIG. 16 is a block diagram of a communication system according to a third modification example.

FIG. 16 is a block diagram illustrating an exemplary configuration of a communication system according to a third modification example. As illustrated in FIG. 16, under the condition in which a plurality of access devices 400 is connected to a particular meshed network (for example, a meshed network 62a), the node 200-2 belonging to that meshed network is connected to the network 61 via one of the access devices 400 (for example, from among access devices 400a to 400c, via the access device 400a).

In the third modification example, the group IDs are used as the information that enables identification of the access devices 400. The communication control device 100-2a sends a group ID to the node 200-2 by issuing a command. Then, the node 200-2 makes changes so as to communicate via the access device 400 specified in the group ID. For example, the communication control device 100-2 switches the specification from the group ID enabling identification of the access device 400a to the group ID enabling identification of the access device 400b, and thus changes the access device 400 to which the communication with the node 200-2 is transferred. In this way, the communication control device 100-2a can control the throughput of the access devices 400.

Meanwhile, before starting communication via a new access device 400, the node 200-2 can perform authentication with that access device 400 using the group key distributed by the communication control device 100-2. Herein, it is assumed that, to the new access device 400, an MKB is distributed in advance, and the group key is distributed in advance by the communication control device 100-2 using unicast communication. As a result of having such a configuration, it becomes possible to reduce the load of the authentication operation performed by the access device 400. That enables achieving further enhancement in the scalability.

Consider a case in which a plurality of nodes 200-2 belonging to the meshed network 62a are to be shifted to a different meshed network 62b. In that case, in an identical manner to the example given above, if the group ID represents information that enables identification of a new access device 400, then the communication control device 100-2a can perform device shifting by sending the group ID to the nodes 200-2 to be shifted.

In an identical manner to the example given above, if the group key has also been distributed, then the authentication between the access device 400 and the nodes 200-2 can be performed using the group key.

Meanwhile, as illustrated in FIG. 16, the communication system according to the third modification example additionally includes a data distribution device 500, which holds the group ID and the group key issued by the communication control device 100-2a using an MKB and some sort of communication method such as unicast communication. To the nodes 200-2 belonging to the group represented by that group ID, the data distribution device 500 distributes data that has been encoded using the group key.

As a result of having such a configuration, the data, such as the firmware of the nodes 200-2 or the environment, that is supposed to be received by all of the nodes 200-2 can be distributed in an efficient manner. Meanwhile, the number of data distribution devices 500 is not limited to one, and it is possible to have a plurality of data distribution devices 500 depending on their role and the network topology.

Figure 17:
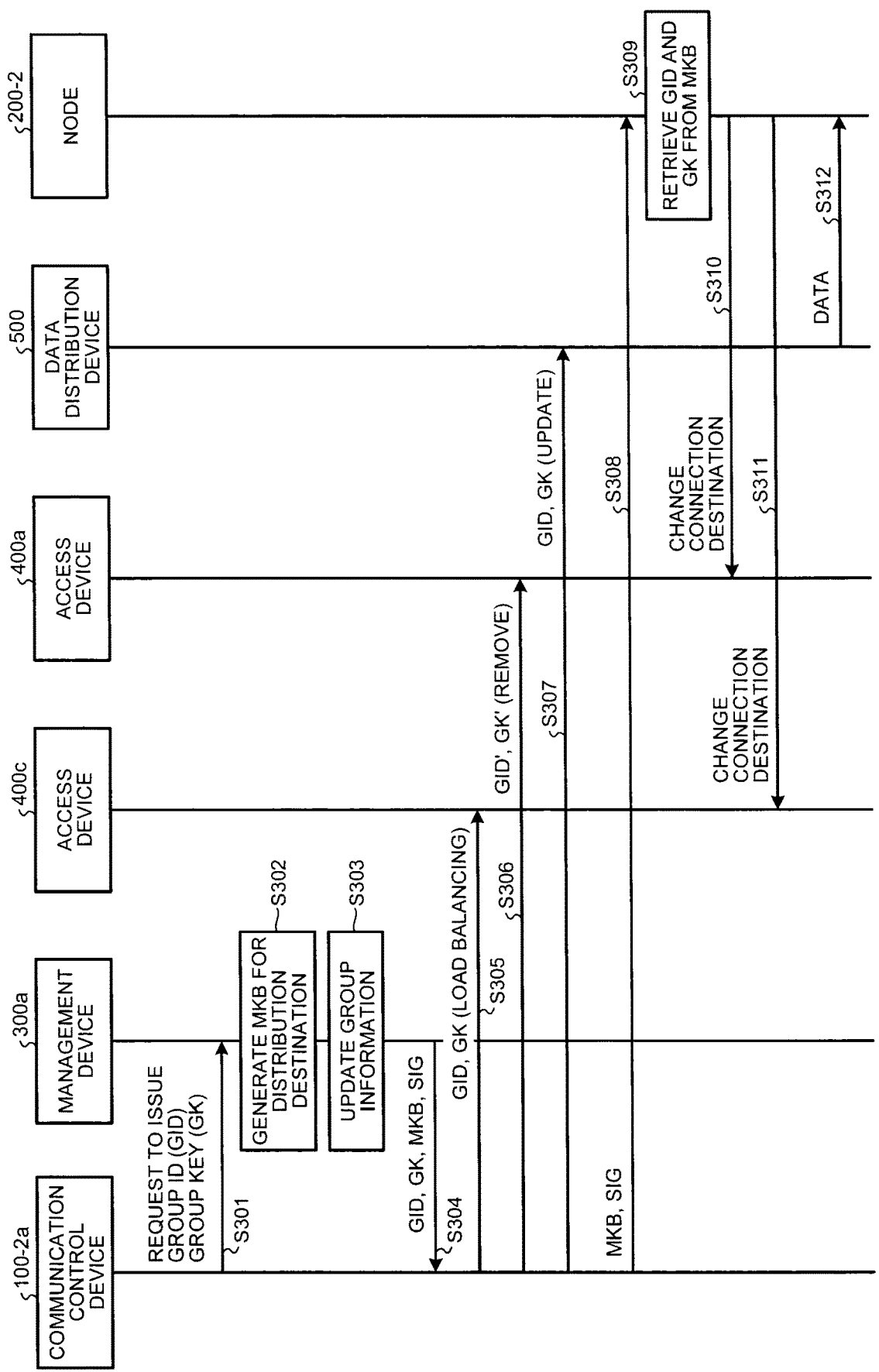
FIG. 17 is a sequence diagram of a communication operation performed in the communication system according to the third modification example.

FIG. 17 is a sequence diagram illustrating an example of a communication operation performed in the communication system according to the third modification example. With reference to FIG. 17, the operations include switching the group to which the node 200-2 belongs from a group accessible using the access device 400a to a group accessible using the access device 400c.

The communication control device 100-2a requests the management device 300a to issue a group ID (GID) and a group key (GK) (Step S301). In response to the request, the MKB generator 108-2 of the management device 300a generates an MKB (Step S302). The group information processor 302 updates the group information stored in the group information storage 321 with the group information to be changed (Step S303). The management device 300a sends the group ID, the group key, the MKB, and the signature to the communication control device 100-2a (Step S304). Herein, the signature is generated by the signature generator 105-2 of the management device 300a.

The communication control device 100-2a specifies the group ID (GID) and the group key (GK), and notifies the access device 400c about the change in the group (Step S305). Herein, "load balancing" represents taking over the operations for the purpose of load dispersion. Meanwhile, the communication control device 100-2 may specify the group ID (GID') used hitherto and the group key (GK') used hitherto, and notify the access device 400a about the change in the group (Step S306). Herein, "remove" represents that the operations with respect to the concerned group are no more necessary.

As may be necessary, instead of performing the operations at Step S305 and Step S306, the communication control device 100-2a specifies the group ID (GID) and the group key (GK), and newly assigns or updates the group key (GK) to be used in data encoding (Step S307). Herein, "update" represents that the group key for the concerned node is updated. As a result of sending the group key in an encoded form, the common data such as the firmware (F/W) required by a number of devices can be sent in an efficient manner. Meanwhile, as may be necessary, the operation at Step S307 can be performed along with the operations at Step S305 and Step S306. Moreover, in order to prevent tampering or falsification of output data of the data distribution device, a signature issued by the data distribution device can also be added.

Herein, "load balancing", "remove" and "update" are only exemplary operations, and the reason for changing a group is not limited to these operations. For example, the command can be defined depending on the intention behind group changing, such as group changing called "failover" that needs to be done when communication cannot be performed due to the malfunctioning or maintenance of the access device 400. Thus, group changing can be implemented in an arbitrary manner.

The communication control device 100-2 notifies the node 200-2 about output information that contains the MKB and the signature (Step S308). Then, from the MKB included in the output information, the node 200-2 retrieves the group ID (GID) and the group key (GK) (Step S309). Subsequently, according to the group ID, the node 200-2 identifies the access device 400a serving as the new connection destination; performs authentication with the access device 400a using the group key (GK); and notifies the access device 400a about the change in the connection destination (Step S310). Herein, the access device 400a allows connection only to the nodes with which the authentication is successful. As a result of performing authentication using the group key (GK), there is a decrease in the processing cost of the access device 400a. Meanwhile, the notification of the change in the connection destination can also be sent to the access device 400c (Step S311). At that time, authentication can be performed using the group key (GK') used hitherto.

In response to a request, the data distribution device 500 distributes data, which is encoded using the group key, to the node 200-2 (Step S312). Herein, instead of using the group key directly in an encoding key, the group key can be converted by implementing a method shared in advance with the node 200-2 and the converted group key can be used as the encoding key. For example, the encoding key can be derived from the group key using a public hash function or a private hash function.

As described above, according to the first to third embodiments, it becomes possible to perform dynamic group management while securing the scalability.

Figure 18:
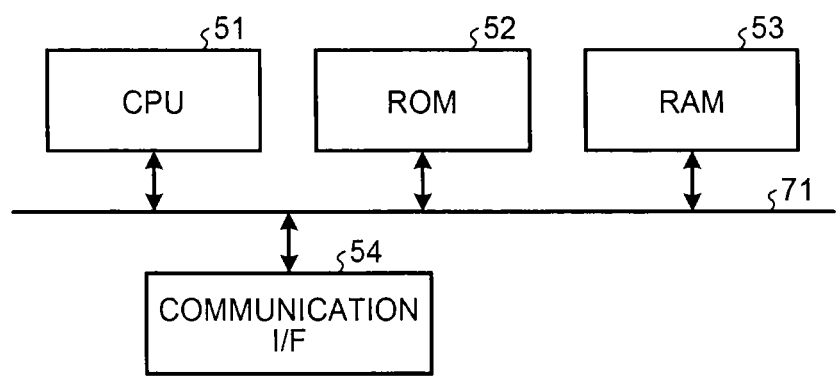
FIG. 18 is a hardware configuration diagram of the devices according to the first to third embodiments.

Explained below with reference to FIG. 18 is a hardware configuration of the devices (the communication control device, the node (the communication device), the management device, the access device, and the data distribution device) according to the first to third embodiments. FIG. 18 is an explanatory diagram illustrating a hardware configuration of the devices according to the first to third embodiments.

The devices according to the first to third embodiments include a control device such as a CPU (Central Processing Unit) 51; storage devices such as a ROM (Read Only Memory) 52 and a RAM (Random Access Memory) 53; a communication I/F 54 that establishes connection with a network and performs communication; and a bus 71 that interconnects the constituent elements.

The programs executed in the devices according to the first to third embodiments are stored in advance in the ROM 52.

Alternatively, the programs executed in the devices according to the first to third embodiments can be stored as installable or executable files in a computer-readable recording medium such as a CD-ROM (Compact Disk Read Only Memory), a flexible disk (FD), a CD-R (Compact Disk Recordable), or a DVD (Digital Versatile Disk), which may be provided as a computer program product.

Still alternatively, the programs executed in the devices according to the first to third embodiments can be saved as downloadable files on a computer connected to a network such as the Internet or can be made available for distribution through a network such as the Internet.

The programs executed in the devices according to the first to third embodiments can cause a computer to function as the constituent elements of the devices. In this computer, the CPU 51 reads the programs from a computer-readable storage medium and loads the programs in a main storage device, and then executes the programs.

Meanwhile, for example, the constituent elements described above either can be implemented when a processor such as the CPU 51 executes programs, that is, implemented using software; or can be implemented using hardware such as an IC (Integrated Circuit); or can be implemented using a combination of software and hardware.

According to at least one of the embodiments described above, it becomes possible to perform dynamic group management while securing the scalability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus that manages a group including a plurality of communication devices, the apparatus comprising:
    a transmitter configured to send, when one or more of the communication devices participating in the group is changed so that which of the communication devices is participating in the group is changed, to communication devices including all of the communication devices participating in the group after changing, and including one or more of the communication devices not participating in the group after changing, first information containing identification information for identifying all the communication devices participating in the group after changing, and second information in which one or more device IDs is encoded,
    the one or more device IDs identifying communication devices participating in the group after changing,
    the second information indicating a height of a tree structure indicating one or more pieces of information corresponding to the one or more device IDs.

2. The information processing apparatus according to claim 1, further comprising:
    a group information storage configured to store group information containing a group ID for identifying the group and the one of more device IDs.

3. The information processing apparatus according to claim 1, wherein
    the one or more of the communication devices not included in the group after changing is the communication devices participating in the group before changing.

4. An information processing apparatus that manages a group including a plurality of communication devices, the apparatus comprising:
    at least one processor to generate, when one or more of the communication devices participating in the group is changed so that which of the communication devices participating in the group is changed, first information containing identification information for identifying all the communication devices participating in the group after changing, and second information in which one or more device IDs is encoded, the one or more device IDs identifying all the communication devices participating in the group after changing, the second information indicating a height of a tree structure indicating one or more pieces of information corresponding to the one or more device IDs; and
    a transmitter configured to send, when the one or more of the communication devices participating in the group is changed, to communication devices including all of the communication devices participating in the group after changing, and including one or more of the communication devices participating in the group before changing and not participating in the group after changing, the first information and the second information.

5. The information processing apparatus according to claim 4, further comprising:
    a group information storage configured to store group information containing a group ID for identifying the group and the one of more device IDs.

6. A transmitting method comprising:
    sending, when one or more of the communication devices included in a group is changed so that which of the communication devices participating in the group is changed, to communication devices including all of the communication devices participating in the group after changing, and including one or more of the communication devices not participating in the group after changing, first information containing identification information for identifying all the communication devices participating in the group after changing, and second information in which one or more device IDs is encoded,
    the one or more device IDs identifying communication devices participating in the group after changing,
    the second information indicating a height of a tree structure indicating one or more pieces of information corresponding to the one or more device IDs.

7. The method according to claim 6, further comprising:
    generating the first information, when one or more of the communication devices participating in the group is changed.

8. The method according to claim 6, wherein
    the one or more of the communication devices not included in the group after changing is the communication devices participating in the group before changing.

* * * * *